US010268618B2

(12) United States Patent
Geva et al.

(10) Patent No.: US 10,268,618 B2
(45) Date of Patent: Apr. 23, 2019

(54) CHIP LEVEL SWITCHING FOR MULTIPLE COMPUTING DEVICE INTERFACES

(71) Applicants: Dror Geva, Tel Aviv (IL); Eyal Liser, Tel Aviv (IL); Roman Mostinski, Tel Aviv (IL)

(72) Inventors: Dror Geva, Tel Aviv (IL); Eyal Liser, Tel Aviv (IL); Roman Mostinski, Tel Aviv (IL)

(73) Assignee: Advanced Micro Devices, Inc., Santa Clara, CA (US)

( * ) Notice: Subject to any disclaimer, the term of this patent is extended or adjusted under 35 U.S.C. 154(b) by 579 days.

(21) Appl. No.: 14/688,350

(22) Filed: Apr. 16, 2015

(65) Prior Publication Data

US 2016/0306763 A1    Oct. 20, 2016

(51) Int. Cl.
G06F 13/40    (2006.01)
G06F 13/42    (2006.01)
G06F 13/36    (2006.01)

(52) U.S. Cl.
CPC .......... G06F 13/4022 (2013.01); G06F 13/36 (2013.01); G06F 13/4282 (2013.01); G06F 2213/0042 (2013.01); Y02D 10/14 (2018.01); Y02D 10/151 (2018.01)

(58) Field of Classification Search
None
See application file for complete search history.

(56) References Cited

U.S. PATENT DOCUMENTS

| 7,865,629 | B1* | 1/2011 | Tantos | G06F 13/385 710/11 |
| 7,904,620 | B2* | 3/2011 | Yao | G06F 13/4027 710/105 |
| 8,051,228 | B2* | 11/2011 | Arimilli | G06F 13/4022 710/62 |
| 8,332,552 | B2* | 12/2012 | Arimilli | G06F 13/385 326/38 |
| 8,615,611 | B2* | 12/2013 | Hall | G06F 13/385 710/66 |
| 9,280,506 | B1* | 3/2016 | Mohanty | G06F 13/385 |
| 10,049,067 | B2* | 8/2018 | Kong | G06F 13/385 |

(Continued)

OTHER PUBLICATIONS

VESA Brings DisplayPort to New USB Type-C Connector by VESA, Sep. 22, 2014.*

(Continued)

Primary Examiner — Steven G Snyder
(74) Attorney, Agent, or Firm — Timothy M. Honeycutt

(57) ABSTRACT

Various semiconductor chips and computing devices are disclosed. In one aspect a semiconductor chip is provided that includes a first interface controller, a first physical layer connected to the first interface controller, a second interface controller, a second physical layer connected to the second interface controller, and a switch connected between the first interface controller and the second interface controller and the first physical layer and the second physical layer. The switch is operable in one mode to route signals to/from the first interface controller via the first physical layer and route signals to/from the second interface controller via the second physical layer and in another mode to route signals to/from both the first interface controller and the second interface controller via the first physical layer.

21 Claims, 5 Drawing Sheets

(56) References Cited

U.S. PATENT DOCUMENTS

| | | | | |
|---|---|---|---|---|
| 2009/0063717 | A1* | 3/2009 | Bohm | G06F 13/4045 710/8 |
| 2009/0175283 | A1* | 7/2009 | Jan | G06F 13/4045 370/401 |
| 2010/0077123 | A1* | 3/2010 | Chien | G06F 13/385 710/305 |
| 2010/0122011 | A1* | 5/2010 | Arimilli | G06F 13/385 710/316 |
| 2010/0122107 | A1* | 5/2010 | Arimilli | G06F 13/4022 713/600 |
| 2012/0110217 | A1* | 5/2012 | Christiansen | G06F 11/349 710/15 |
| 2012/0265919 | A1* | 10/2012 | Jono | G06F 13/4059 710/316 |
| 2013/0061003 | A1* | 3/2013 | Millet | G06F 13/4022 711/141 |
| 2013/0275629 | A1* | 10/2013 | Hall | G06F 13/385 710/14 |
| 2013/0324186 | A1* | 12/2013 | Wasily | H04W 88/06 455/552.1 |
| 2014/0181419 | A1* | 6/2014 | Saund | G06F 13/28 711/146 |
| 2014/0372663 | A1* | 12/2014 | Chandra | G06F 13/385 710/316 |
| 2015/0331826 | A1* | 11/2015 | Ghosh | G06F 13/4022 710/313 |
| 2016/0112711 | A1* | 4/2016 | Hundal | G06F 13/4282 375/240.26 |
| 2016/0187420 | A1* | 6/2016 | Trethewey | G01R 31/31705 714/727 |
| 2016/0335221 | A1* | 11/2016 | Zhu | G06F 13/36 |
| 2017/0024347 | A1* | 1/2017 | Dao | G06F 1/185 |
| 2017/0161228 | A1* | 6/2017 | Wang | G06F 13/4291 |
| 2018/0157609 | A1* | 6/2018 | Kong | G06F 13/385 |

OTHER PUBLICATIONS

'Universal Serial Bus 3.1 Specification' Revision 1.0, Jul. 26, 2013.*

*VESA DisplayPort Alt Mode for USB Type-C Standard Feature Summary;* www.vesa.org; Sep. 22, 2014; pp. 1-17.

Brian Nadel; *USB Type-C: Simpler, faster and more powerful;* Computerworld; Apr. 15, 2014; pp. 1-5.

* cited by examiner

CHIP LEVEL SWITCHING FOR MULTIPLE COMPUTING DEVICE INTERFACES

BACKGROUND OF THE INVENTION

1. Field of the Invention

This invention relates generally to electronic devices, and more particularly to structures and methods of combining signals of multiple interfaces on a single interface.

2. Description of the Related Art

Display port (DP) is an architecture capable of conveying video signals to an external device, such as a display or monitor or other type of display device. DP is a video interface that is a more advanced version than conventional types of interfaces such as VGA and DVI. Universal serial bus (USB) is a technology that allows connection of many different types of peripherals to a computing device, such as a personal computer, sometimes with the aid of a hub and sometimes via a single attachment point. USB technology has evolved through multiple generations from 1.0 to a pending 3.1. DP technology has evolved recently to generation 1.3.

The USB Promoters Group and VESA have recently announced a new reversible USB 3.1 Type C connector that is operable to simultaneous transport DP 1.3 signals. A typical conventional computing device that incorporates a USB 3.1 port will include a system circuit board populated with one or more semiconductor chips and a USB 3.1 port, typically in female form. A male connector of a USB 3.1 cable may be inserted into the port in order to establish a connection between the conventional computing device and some peripheral device, such as a hard drive, monitor or some other device. A conventional semiconductor chip in a conventional electronic device that has both a DP 1.3 and a USB 3.1 controller will also have two discrete physical layers frequently abbreviated PHY. Each PHY is dedicated to a particular controller. In order to implement simultaneous operation of both the USB 3.1 and DP 1.3 signals, the system board is provided with a multiplexer (MUX). The provision of a MUX on the system board increases the complexity of the board and may introduce latency or other signal integrity issues such as jitter.

The present invention is directed to overcoming or reducing the effects of one or more of the foregoing disadvantages.

SUMMARY OF THE INVENTION

In accordance with one aspect of the present invention, a semiconductor chip is provided that includes a first interface controller, a first physical layer connected to the first interface controller, a second interface controller, a second physical layer connected to the second interface controller, and a switch connected between the first interface controller and the second interface controller and the first physical layer and the second physical layer. The switch is operable in one mode to route signals to/from the first interface controller via the first physical layer and route signals to/from the second interface controller via the second physical layer and in another mode to route signals to/from both the first interface controller and the second interface controller via the first physical layer.

In accordance with another aspect of the present invention, a method of manufacturing is provided that includes fabricating a semiconductor chip with a first interface controller, a first physical layer connected to the first interface controller, a second interface controller, a second physical layer connected to the second interface controller, and a switch connected between the first interface controller and the second interface controller and the first physical layer and the second physical layer. The switch is operable in one mode to route signals to/from the first interface controller via the first physical layer and route signals to/from the second interface controller via the second physical layer and in another mode to route signals to/from both the first interface controller and the second interface controller via the first physical layer.

In accordance with another aspect of the present invention, a method of conveying signals for a first interface and a second interface of a computing device is provided. The method includes operating a semiconductor chip of the computing device. The semiconductor chip includes a first interface controller, a first physical layer connected to the first interface controller, a second interface controller, a second physical layer connected to the second interface controller, and a switch connected between the first interface controller and the second interface controller and the first physical layer and the second physical layer. The switch is operable in one mode to route signals to/from the first interface controller via the first physical layer and route signals to/from the second interface controller via the second physical layer and in another mode to route signals to/from both the first interface controller and the second interface controller via the first physical layer. The switch is operated in the first mode or the other mode.

In accordance with another aspect of the present invention, a semiconductor chip is provided that includes a first interface controller, a second interface controller, a first physical layer and a switch connected between the first interface controller and the second interface controller and the first physical layer. The switch is operable to route signals to/from both the first interface controller and the second interface controller via the first physical layer.

BRIEF DESCRIPTION OF THE DRAWINGS

The foregoing and other advantages of the invention will become apparent upon reading the following detailed description and upon reference to the drawings in which.

DETAILED DESCRIPTION OF SPECIFIC EMBODIMENTS

Chip level switching is used to selectively route interface signals from two different interfaces, such as a serial interface such as USB and a display interface such as display port (DP), via the physical layer (PHY) associated with one interface or the other. For example, a MUX may be used to simultaneously route signals to/from a USB controller and a DP controller via the PHY of the USB interface. The recently-introduced USB 3.1 specification supports USB 3.1 and DP 1.3 signals on the same port/cable etc. In variations other interfaces may also be used. Additional details will now be described.

Figure 1:
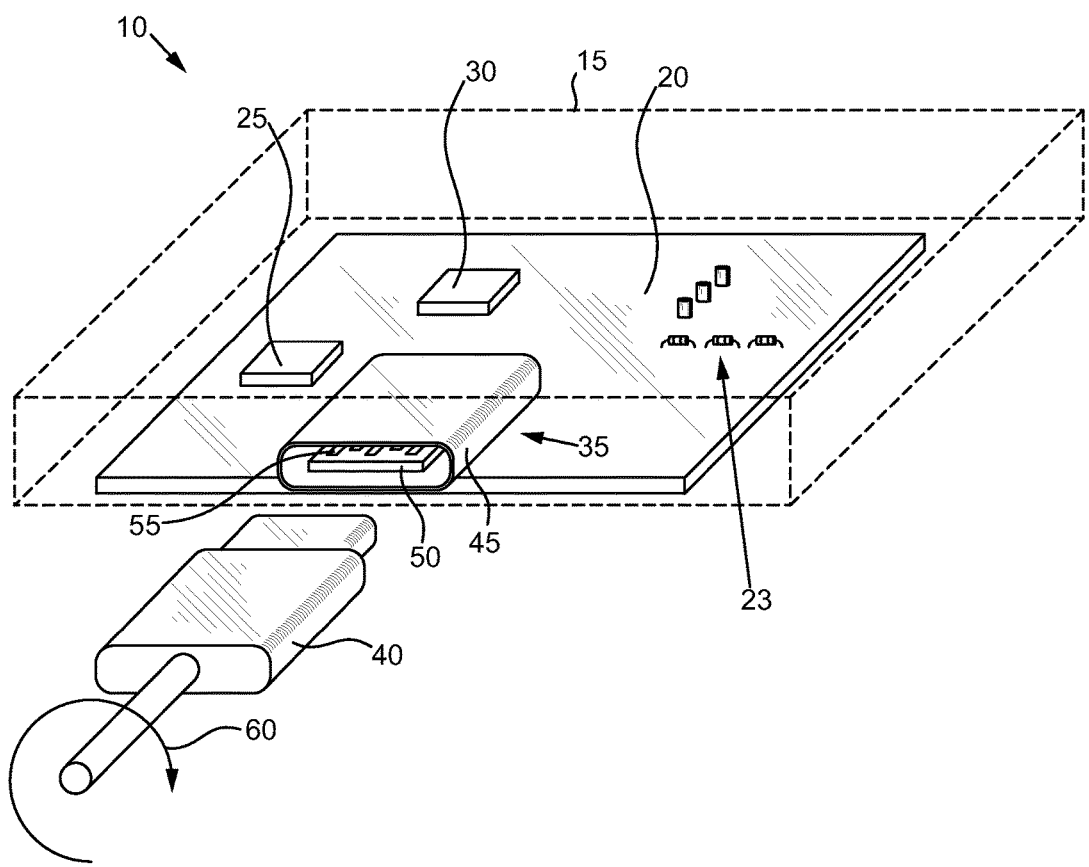
FIG. 1 is a pictorial view of an exemplary embodiment of a computing device.

In the drawings described below, reference numerals are generally repeated where identical elements appear in more than one figure. Turning now to the drawings, and in particular to FIG. 1, therein is depicted a pictorial view of an exemplary embodiment of a computing device 10 that includes an enclosure 15 and a circuit board 20 positioned in the enclosure 15. The computing device 10 may take on a great variety of different form factors. Accordingly, the enclosure 15 is schematically represented as a dashed box. Exemplary physical implementations of the computing device 10 include for example, a desktop computer, a tablet computer, a handheld device (e.g., a smart phone) or other electronic device.

The circuit board 20 may be fabricated in various forms, such as multi-layer organic, multi-layer ceramic, or other configurations. In this illustrative embodiment, the circuit board 20 has a rectangular footprint. However, the board 20 may be fabricated with virtually any shape. The circuit board 20 may be populated with many different types of electronic components, such as passive components 23 and one or more semiconductor chips, two of which are shown and labeled 25 and 30, respectively. The semiconductor chips 25 and 30 may be integrated circuits dedicated to video processing, central processing units (CPU), graphics processing units (GPU), accelerated processing units (APU) that combines microprocessor and graphics processor functions, a system-on-chip, an application specific integrated circuit or other device. A variety of packages may be used for the semiconductor chips 25 and 30, such as flip-chip ball grid array, glob top, chip-scale packaging or others. The semiconductor chips 25 and 30 may be fabricated from well-known materials, such as silicon or other semiconductors, well-known metals and insulators. Well-known techniques may be used to fabricate the circuit structures disclosed herein, such as photolithography, etching, plating, chemical and physical vapor deposition, planarization and/or other techniques.

The circuit board 20 may include multiple interfaces. Examples include USB, DP, PCIe, SATA, analog audio or others. The interfaces may be ported using discrete ports or combined on one or more ports. For example, the circuit board 20 may be provided with one or more ports, one of which is depicted and labeled 35. The port 35 may be any of a great variety of different types of ports, such as a USB port, dedicated video ports, audio ports, ethernet ports or others. In an exemplary embodiment, the port 35 may be an USB 3.1 Type C port that is operable to receive a corresponding male USB 3.1 Type C connector 40. In this illustrative embodiment, the port 35 includes an oval shaped receptacle 45 that includes an internally mounted substrate 50 provided with plural conductor pins 55 and a corresponding plurality of pins that are located underneath the substrate 50 and out of view. In this way, the connector 40 is reversible and may be inserted into the receptacle 45 in the orientation shown in FIG. 1 or alternatively in a position rotated 180° from that shown in FIG. 1 as suggested by the arrow 60.

In other implementations, the port 35 may be configured differently, including a differently shaped receptacle and pin placement, while still allowing the reversible reception of the connector 40. In yet other variations, the configuration of the port 35 may not allow a reversible reception of the connector 40. The computing device 10 and at least one of the semiconductor chips 25 or 30 are configured so that the USB 3.1 port 35 is operable to convey both USB 3.1 and DP 1.3 signals.

Figure 2:
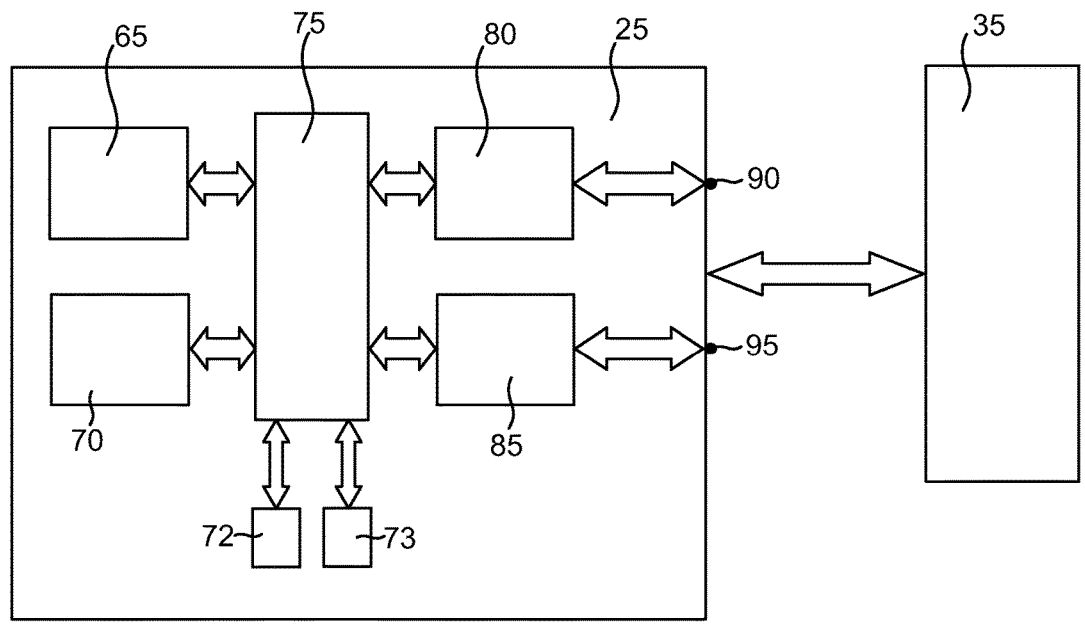
FIG. 2 is a schematic view of an exemplary semiconductor chip of the computing device of FIG. 1.

The switching hardware to enable conveyance of both USB 3.1 and DP 1.3 signals may be implemented at the chip level. In an illustrative embodiment, the semiconductor chip 25 may include such hardware. Attention is now turned to FIG. 2, which is a schematic representation of the semiconductor chip 25 and the port 35. The semiconductor chip 25 may include a myriad of different logical blocks. In this illustrative embodiment, those blocks may include, for example, a USB 3.1 controller 65, a DP 1.3 controller 70, an optional PCIe controller 72, an optional SATA controller 73 and a switch 75 that is connected to the USB 3.1 controller 65, the DP 1.3 controller 70, the PCIe controller 72 and the SATA controller 73. The switch 75 may be a MUX or other type of switch. Hereinafter MUX will be used as a shorthand for the switch 75. It is preferable, though not necessary, that the MUX 75 connects to the digital interface sides of the USB 3.1 controller 65 and the DP 1.3 controller 70. There is a USB PHY 80 associated with the USB 3.1 controller 65 and a DP PHY 85 associated with the DP 1.3 controller 70. The skilled artisan will appreciate that the term "PHY" or physical layer refers to the physical routing between the MUX 75 and an input/output of the semiconductor chip 25, such as the input/outputs (I/Os) 90 and 95. The I/Os 90 and 95 may be any of a myriad of different types of physical connections between a semiconductor chip and some other device. Examples include pads, bumps, microbumps, pins or any of the other different types of input/output connections. The USB 3.1 PHY 80 and the DP 1.3 PHY 85 may be composed of traces, vias or any of the other types of electrical connections used in or on a semiconductor chip. As described in more detail below, multiple interfaces, such as USB 3.1, DP 1.3, PCIe and/or SATA or additional interfaces may be implemented on the same PHY, such as the USB 3.1 PHY 80.

Figure 3:
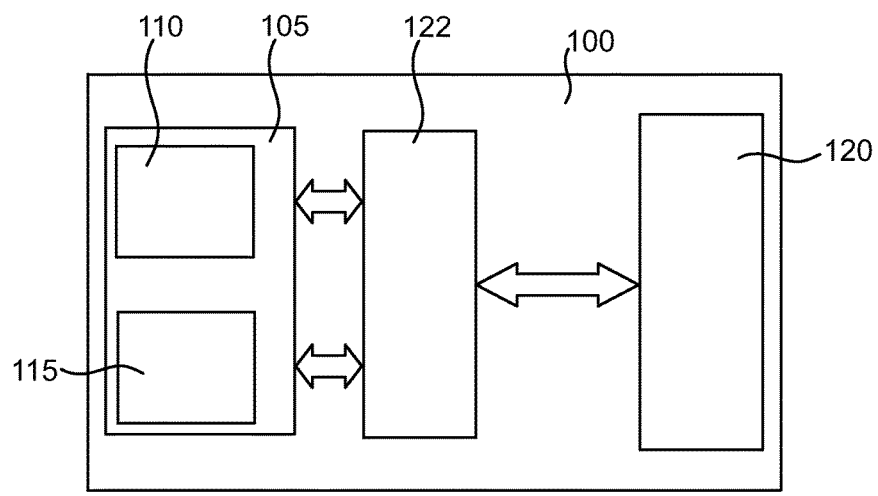
FIG. 3 is a schematic view of a conventional semiconductor chip.

It may be useful to briefly contrast a conventional configuration for implementing simultaneous USB 3.1 and DP 1.3 interfaces on a USB 3.1 pathway. In this regard, attention is turned to FIG. 3, which is a schematic view of a conventional circuit board 100. The circuit board 100 includes a semiconductor chip 105 that has a USB 3.1 controller 110 and a DP 1.3 controller 115. The board 100 also includes a USB 3.1 Type C port 120. Here, the signals to and from the USB 3.1 controller 110 and the DP 1.3 controller 115 may be routed to the USB 3.1 Type C port 120 by way of a board-mounted MUX 122. As noted above in the Background section, this configuration has the disadvantage of board and simulation complexity, and potential signal jitter associated with board level multiplexing.

Figure 4:
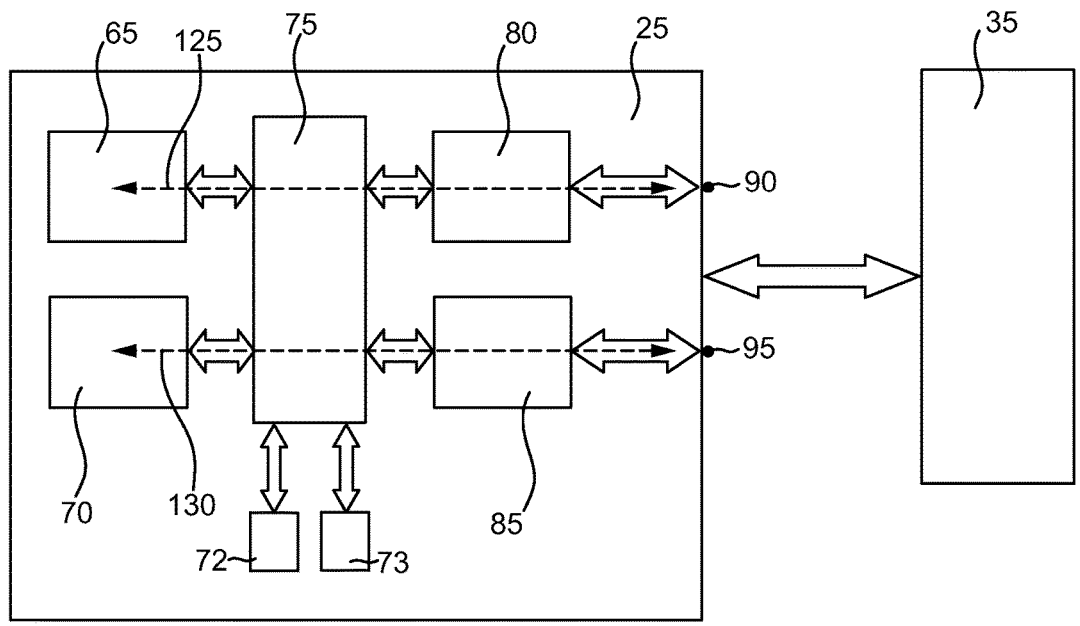
FIG. 4 is a schematic view like FIG. 2 but depicting operation of an onboard switch/multiplexer in independent mode.

Attention is turned again to FIG. 2 and now also to FIG. 4, which is a schematic view like FIG. 2 but depicting signal propagation. The MUX 75 may be set to independent mode or simultaneous mode. In independent mode, a given interface, such as USB 3.1, is routed through a particular PHY. In simultaneous mode, multiple interfaces are routed through a particular PHY. In this illustration, the MUX 75 is set to independent mode. Thus, signals to and from the USB 3.1 controller 65 represented by the dashed line 125 may be delivered to and from the I/O 90 by way of the MUX 75 and the PHY 80. Similarly, the signals to and from the DP 1.3 controller 70 represented by the dashed line 130 may be delivered to and from the I/O 95 by way of the MUX 75 and the PHY 85. In the embodiment illustrated in FIG. 4, both the PHY 80 and the PHY 85 may be powered simultaneously and used as essentially separate channels to propagate the USB 3.1 and DP 1.3 signals to the port 35. The optional additional PCIe interface 72 and SATA interface 73 (and others) may be operated in independent mode as well.

Figure 5:
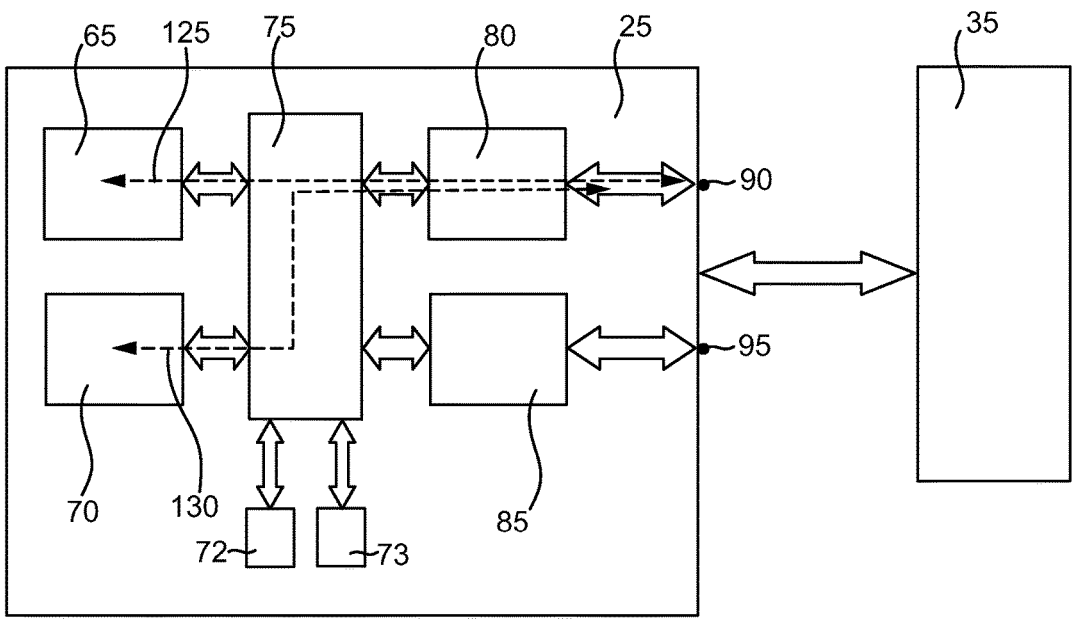
FIG. 5 is a schematic view like FIG. 4 but depicting operation of the onboard switch/multiplexer in simultaneous mode.

Alternatively, and as depicted schematically in FIG. 5, the MUX 75 may be set to operate in simultaneous mode. Here, the MUX 75 is set to route USB 3.1 signals 125 and DP 1.3 signals 130 to and from the port 35 via a single PHY, in this case the PHY 80. The PHY 85 is bypassed and may even be shut down to save power. This may be useful in circumstances where bandwidth considerations are low enough that the PHY 85 may be powered down and achieve significant power savings while still providing enough performance for the computing device 10 (see FIG. 10). The types of conditions necessary for powering down the PHY 85 may be detected by the controllers 65 or 70 or some other piece of logic associated with the semiconductor chip 25 as desired. In any event, both the USB 3.1 and DP 1.3 signals 125 and 130 may be transferred to and from the port 35 by way of the PHY 80 while the PHY 85 is by-passed and/or powered down. The optional additional PCIe interface 72 and SATA interface 73 (and others) may be operated in simultaneous mode as well.

Setting the MUX 75 to independent mode or simultaneous mode may be performed in a variety ways. For example, if a BIOS is used to manage certain functions of the semiconductor chip 25, then the MUX 75 may be set to independent mode or simultaneous mode by the BIOS at power up. In another alternative, the settings for the MUX 75 may be controlled via software at the operating system level, driver level or even application level or some combination thereof, and may or may not require user input. In another alternative, the MUX 75 may be set to dynamically switch from independent mode to simultaneous mode and back. Again, this may be implemented at the operating system level, driver level, application level or some combination thereof. The decision to switch modes for the MUX 75 may be based on a method(s) that takes into account the number and types of connected peripherals, battery charge levels (if on battery power), chip activity levels, device temperature or other factors.

Figure 6:
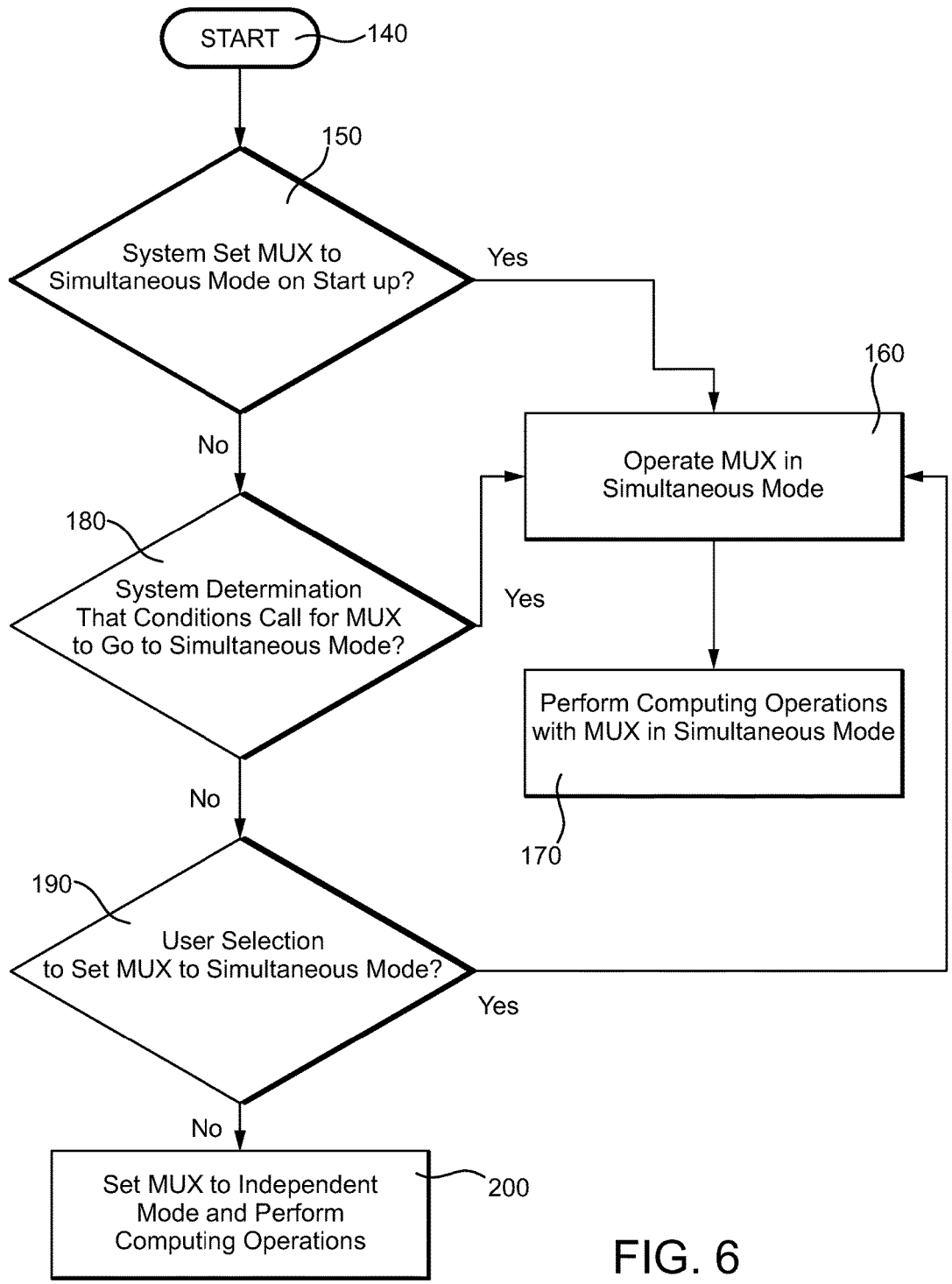
FIG. 6 is a schematic flow chart depicting an exemplary control scheme for the computing device depicted in FIG. 1.

An exemplary control scheme for the computing device 10 depicted in FIG. 1 may be understood by referring now to the flow chart depicted in FIG. 6. After the start at step 140, there is a system check at step 150 to determine if the MUX (i.e. the MUX 75 in FIGS. 2 & 4) is set to simultaneous mode on system start up. This may be accomplished by way of a BIOS, or other nonvolatile memory instruction execution at start up. Not all systems need to include such a start up test to determine the status of the MUX mode. If at step 150 there is a system determination that the MUX is set to simultaneous mode on start up then at step 160, the computing device 10 is operated in simultaneous mode. Furthermore, at step 170 the computing device may perform computing operations in simultaneous mode. If, however, at step 150 there is no system determination to operate the MUX in simultaneous mode at start up then at step 180 the system may determine if conditions call for operation in simultaneous mode. This step may entail for example, examining the types of peripherals, if any, connected to the computing device, the type of software being executed and the power level of any batteries on board and other parameters. If at step 180 the system determines that conditions are correct for operating in simultaneous mode then the system proceeds to step 160 as described above. If however at step 180 the system does not determine that the conditions are correct for simultaneous mode then the control scheme proceeds to step 190. At step 190, the user may instruct the computing device 10 to operate in simultaneous mode. Here, the user may, for example, open up a particular application that provides the ability to change the multiplexer setting. Optionally, this may also be performed at the operating system level or some other level of software abstraction. If at step 190 the user does select simultaneous mode then the system proceeds to step 160 as described above. If however, at step 190, the user does not select simultaneous mode, the user may at step 200 select independent mode, or the system may default at step 200 to independent mode.

Figure 7:
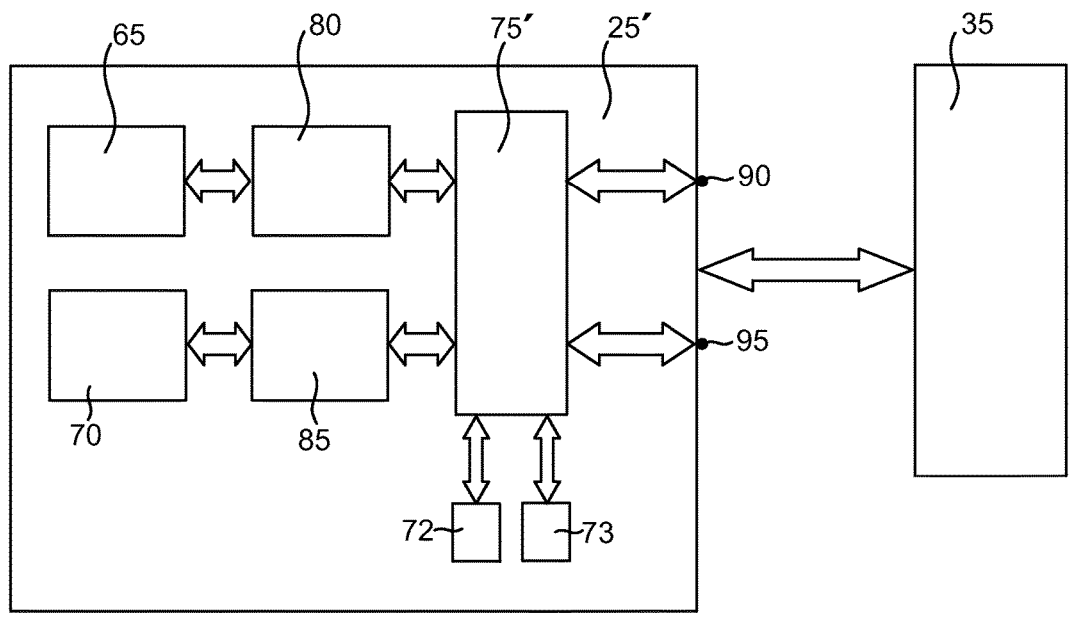
FIG. 7 is a schematic view of an alternate exemplary embodiment of a semiconductor chip.

An alternate exemplary embodiment of a semiconductor chip 25' may be understood by referring now to the schematic diagram in FIG. 7. Here, the chip 25' may include the controller 65 and 70 and PHY 80 and PHY 85 as generally described above. However, in this illustrative embodiment, a MUX 75' may be positioned between the PHY 80 and PHY 85 and the actual I/Os 90, 95 of the chip 25'. In other words, the MUX 75' may be positioned at what is essentially the analog side of the PHY 80 and PHY 85 as opposed to the more digital side for the embodiments depicted in FIGS. 2 and 4 for example. The other interfaces 72 and 73 as described above may be patched into the MUX 75' and of course the signals to and from the MUX may be delivered to the port 35. The independent and simultaneous modes described above may be used here as well.

Figure 8:
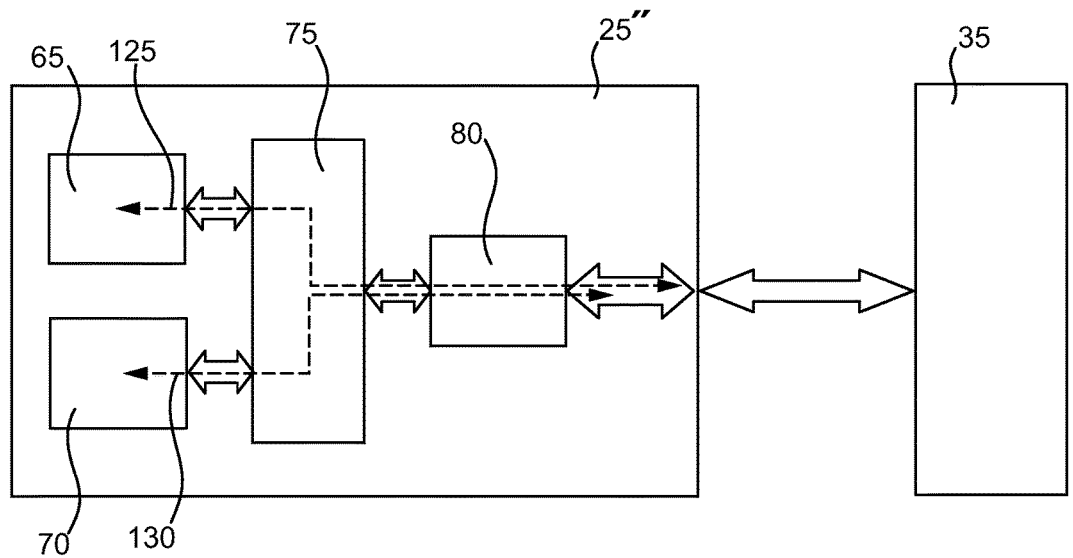
FIG. 8 is a schematic view of another alternate exemplary embodiment of a semiconductor chip.

Another alternate exemplary embodiment of the semiconductor chip 25" may be understood by referring now to the schematic depicted in FIG. 8. Here, the semiconductor chip 25" may include the controllers 65 and 70 as generally described above. However, in lieu of multiple physical layers PHY 80 and PHY 85 as in FIGS. 2 and 4, the MUX 75 may be used in conjunction with a single physical layer in this case the PHY 80. Again, the signals from the controller 65 represented by the dashed line 125 and the signals to and from the controller 70 represented by the dashed line 130 may be multiplexed to and from the PHY 80 by way of the MUX 75 and ultimately to and from the port 35. This hard wired approach using a single PHY 80 may provide for a smaller die size, albeit with perhaps a greater complexity of circuit layout.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A semiconductor chip, comprising:
   a first interface controller;
   a first physical layer connected to the first interface controller;
   a second interface controller;
   a second physical layer connected to the second interface controller; and
   a switch connected between the first interface controller and the second interface controller and the first physical layer and the second physical layer, the switch being operable in one mode to route signals to/from the first interface controller via the first physical layer and route signals to/from the second interface controller via the second physical layer and in another mode to route signals to/from both the first interface controller and the second interface controller via the first physical layer.

2. The semiconductor chip of claim 1, wherein the first interface controller comprises a USB controller.

3. The semiconductor chip of claim 2, wherein the second interface controller comprises a display port controller.

4. The semiconductor chip of claim 1, comprising a port connected to the first physical layer and the second physical layer.

5. The semiconductor chip of claim 4, wherein the port comprises a USB port.

6. A computing device, comprising:
a first semiconductor chip including a first interface controller, a first physical layer connected to the first interface controller, a second interface controller, a second physical layer connected to the second interface controller, and a switch connected between the first interface controller and the second interface controller and the first physical layer and the second physical layer, the switch being operable in one mode to route signals to/from the first interface controller via the first physical layer and route signals to/from the second interface controller via the second physical layer and in another mode to route signals to/from both the first interface controller and the second interface controller via the first physical layer; and
a port connected to the first semiconductor chip to convey the signals between the computing device and another device.

7. The computing device of claim 6, wherein the first interface controller comprises a USB controller.

8. The computing device of claim 7, wherein the second interface controller comprises a display port controller.

9. The computing device of claim 6, wherein the port comprises a USB port.

10. A method of manufacturing, comprising:
fabricating a semiconductor chip including a first interface controller, a first physical layer connected to the first interface controller, a second interface controller, a second physical layer connected to the second interface controller, and a switch connected between the first interface controller and the second interface controller and the first physical layer and the second physical layer, the switch being operable in one mode to route signals to/from the first interface controller via the first physical layer and route signals to/from the second interface controller via the second physical layer and in another mode to route signals to/from both the first interface controller and the second interface controller via the first physical layer.

11. The method of claim 10, wherein the first interface controller comprises a USB controller.

12. The method of claim 11, wherein the second interface controller comprises a display port controller.

13. The method of claim 10, comprising connecting a port to the first physical layer and the second physical layer.

14. The method of claim 13, wherein the port comprises a USB port.

15. The method of claim 10, comprising mounting the semiconductor chip in a computing device.

16. A method of conveying signals for a first interface and a second interface of a computing device, comprising:
operating a semiconductor chip of the computing device, the semiconductor chip including a first interface controller, a first physical layer connected to the first interface controller, a second interface controller, a second physical layer connected to the second interface controller, and a switch connected between the first interface controller and the second interface controller and the first physical layer and the second physical layer, the switch being operable in one mode to route signals to/from the first interface controller via the first physical layer and route signals to/from the second interface controller via the second physical layer and in another mode to route signals to/from both the first interface controller and the second interface controller via the first physical layer; and
operating the switch in the first mode or the other mode.

17. The method of claim 16, wherein the first interface controller comprises a USB controller.

18. The method of claim 17, wherein the second interface controller comprises a display port controller.

19. The method of claim 16, wherein a port is connected to the first physical layer and the second physical layer.

20. The method of claim 19, wherein the port comprises a USB port.

21. A semiconductor chip, comprising:
a first interface controller;
a second interface controller;
a first physical layer; and
a switch connected between the first interface controller and the second interface controller and the first physical layer, the switch being operable to route signals to/from both the first interface controller and the second interface controller via the first physical layer.

* * * * *